Feb. 22, 1949. S. G. WINGQUIST 2,462,700
UNIVERSAL JOINT

Filed June 18, 1945 2 Sheets-Sheet 1

Inventor
S. G. Wingquist
By Mascort Downing Seekley
Attys

Feb. 22, 1949.  S. G. WINGQUIST  2,462,700
UNIVERSAL JOINT

Filed June 18, 1945  2 Sheets-Sheet 2

Inventor
S. G. Wingquist

Patented Feb. 22, 1949

2,462,700

UNITED STATES PATENT OFFICE 2,462,700

UNIVERSAL JOINT

Sven Gustaf Wingquist, Goteborg, Sweden

Application June 18, 1945, Serial No. 600,155
In Sweden July 4, 1944

8 Claims. (Cl. 64—21)

The invention relates to universal joints of the type having a single point of deflection and comprising a driving and a driven joint member, each having arms provided with races between which are interposed rollers for transmitting motion between the joint members.

If in a joint of this type power is transmitted between angularly deflected shafts and if the driven joint member is to have an angular velocity uniform with that of the driving joint member it is necessary for the rollers to be guided in or substantially in the bisector plane of the joint members. For this purpose the rollers may be guided by one or more roll holders which in turn are guided by a bisecting member disposed between the joint members and connected thereto for example by ball and socket joints. The rollers may also be guided directly by the bisecting member, i. e. the roll holder may be left out. In either case, however, the rollers are guided by a guide member. The guide member, whether it be a roll holder or a bisecting member, may be provided with recesses or grooves in which the rollers are mounted.

According to the invention, each joint member has at least two pairs of arms, the arms have races on each side thereof in a peripheral direction and further are situated alternately on a larger and a smaller radius from the centre of deflection, the inner arms on one joint member being situated inside of the outer arms on the other joint member and vice versa. As there are races on both sides of the arms in a peripheral direction the number of rollers will be the same as the number of arms on one joint member. The object of this arrangement, as explained in the following, is to make it possible to reduce the free length of the arms.

Figure 1:
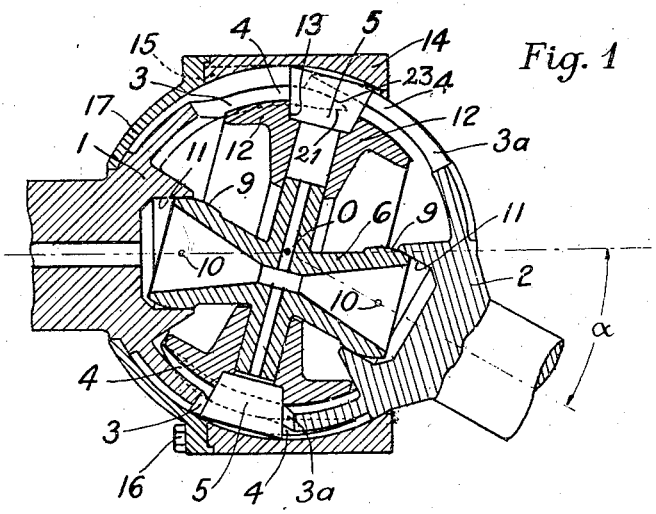
Figure 2:
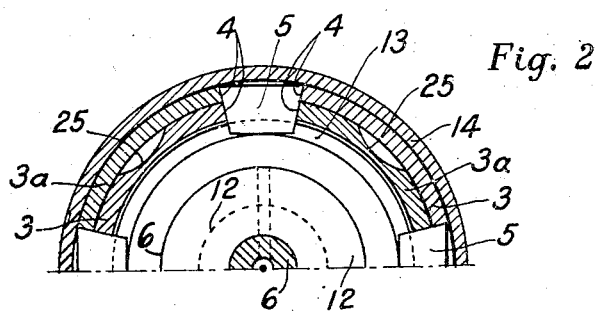
Figures 7, 8:
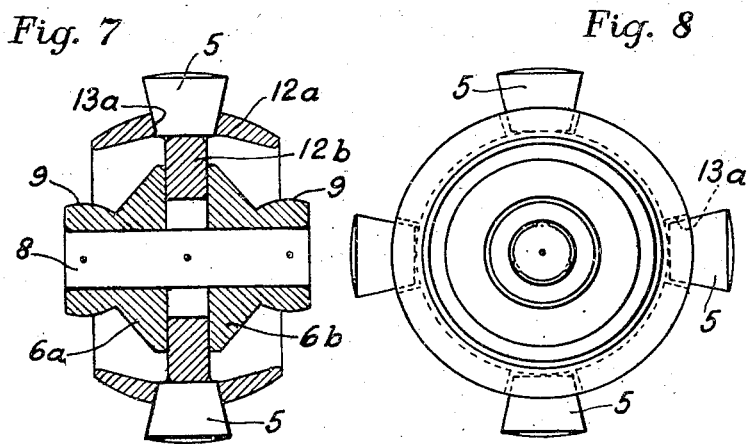
Figure 3:
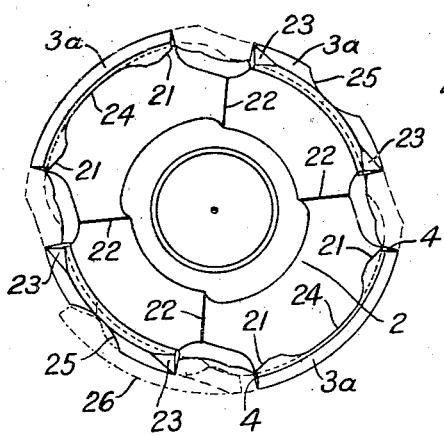
Figure 4:
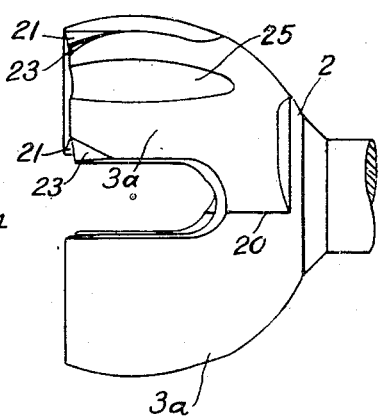
Figure 6:
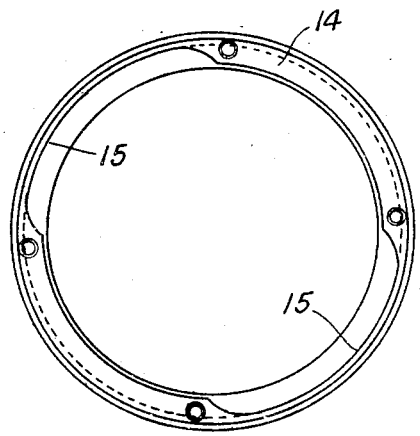
Figure 5:
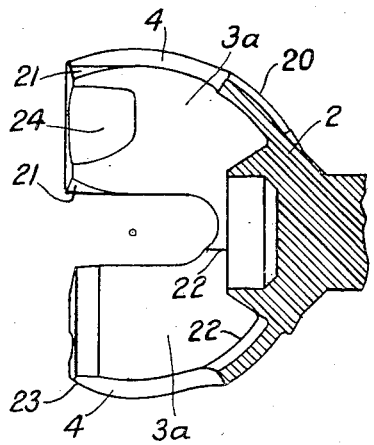

One embodiment of the invention in which a roll holder as well as a bisecting member is provided will be described in the following with reference to the accompanying drawings. In these Fig. 1 shows an axial section and Fig. 2 a radial section through the complete joint. Figs. 3–5 show one of the joint members, Fig. 3 showing a view from the end, Fig. 4 a view from the side and Fig. 5 an axial section. Fig. 6 shows a view from one end of a housing surrounding the joint, and Figs. 7 and 8 show a modified form of a bisecting member with roll holder.

In the figures 1 denotes the driving and 2 the driven joint member, each having arms 3 and 3a respectively which on the outside and inside are spherical, the centres of the spheres coinciding with the centre 0 of deflection of the joint. Each joint member has four arms and of these two opposed arms are situated on a larger radius from the centre 0 and the other two on a smaller radius, the inner radius of the outer arms being at least equal to outer radius of the inner arms. The joint members have common inner and outer spherical surfaces. The arms have races 4 on both sides thereof in a peripheral direction and between these are interposed rollers 5 which in the embodiment shown are conical.

For guiding the rollers in the bisector plane the following means are provided:

Centrally between the joint members 1, 2 is disposed a bisecting member 6 having portions 9 which are spherical on the outside, the centres 10 of the spheres being on the axis of the joint, symmetrically relatively to the centre 0 of the joint. The spherical portions rest in cylindrical seats 11 in the joint members 1 and 2.

12 denotes a roll holder, comprising two annular parts, which is slidable relatively to the bisector member 6 in a radial direction at right angles to the axis of the bisecting member. The conical rollers are mounted in grooves 13 in the roll holder. Owing to the symmetrical arrangement relatively to the points 10 the bisector member for each angle of deflection α of the joint members always deviates by an angle $$\frac{\alpha}{2}$$

from the original position at right angles to the axis of the joint when the shafts are in alignment, and thus also the rollers 5, guided by the holder 12, take up this position. When the joint members are angularly deflected the roll holder turns about the centre 0 of the joint, in the plane of the paper in Fig. 1, whereas the bisecting member is displaced in such manner that the central axis thereof no longer passes through the centre of deflection of the joint, as seen in Fig. 1.

The joint members are held together in an axial direction by a housing 14 having an inner spherical surface fitting on the common outer spherical surface of the joint members. In order to make it possible to introduce the joint members into the housing the latter has two axial grooves or recesses 15, see Figs. 1 and 6, which from one end of the housing extend to the radial centre plane thereof and which in the embodiment shown are diametrically opposed. To the housing is by means of bolts 16 secured a lid 17 which in turn is secured to the joint member 1, for example by the lid being a tight or a square fit on the joint member 1. It is also possible to provide the joint member with projections entering corresponding recesses in the lid, so as to prevent rotation of the lid relatively to the joint member.

The rollers at the outer ends have spherical surfaces engaging with the spherical inner surface of the housing and by this means are held in correct positions between the races, i. e. with their axes always passing through the centre of the joint.

In the modified form shown in Figs. 7 and 8 the bisecting member consists of two similar halves 6a, 6b held together by means of a bolt 8 having press seats. The roll holder consists of an annular ring 12a having an inner central wall 12b which is slidable in the bisecting member at right angles to the axis thereof. In the annular ring 12 pockets 13a are provided for the rollers. These pockets guide the rollers in the axial direction of the roll holder but permit the necessary freedom of movement in a peripheral direction.

Universal joints to be used for small angles of deflection may have relatively short arms which on load have the required strength. If on the other hand the angle of deflection is larger, for example 30° and more, the arms must be made longer and then it becomes a problem to combine strength of the arms with a reasonable size of the joint. As the joint preferably is spherical on the outside it follows that there is a tendency for the arms to taper off towards the base with consequent weakening at a point where strength is required.

This difficulty is overcome by the use of double rows of arms as shown and described. The transmission of power takes place through two systems of arms concentric with the centre of deflection, and the arms on each joint member partly cover each other at the base and at this point are joined together to form a base portion, so that the free length of the arms may be made as short as possible, i. e. not longer than is necessary to accommodate the rollers when the angle of deflection of the joint members is at its maximum. The space for the inner members of the joint has the shape of a sphere common to both joint members, the radius of the sphere being equal to the inner radius of the arms.

Also on the outside the joint has the shape of a sphere common to both joint members on which a protective housing can be placed. The radius of this sphere is that of the outer radius of the arms.

The use of two rows of arms has other advantages. In a joint member of the known type having a single row of arms forming part of the same sphere the arms may be strengthened at their base by means of an annular member on the outside or the inside. In the first case the size of the joint is increased and in the latter case the space for the inner members in the joint is reduced which in turn makes it necessary to make the joint larger. In the joint according to the invention on the other hand the dimensions of the joint members are determined by the outer and inner radii of the arms.

Another disadvantage of the known joints having a single row of arms is that for a certain direction of rotation alternate rollers are inactive and that for the transmission of power only half the number of rollers and races are used. In the joint according to the invention when two rows of arms are used each roller is always under load either between two outer or two inner races. In this way the load is more equally distributed than is the case in the known joints having the same number of rollers. The force with which the rollers press against the races is also reduced to half that acting in the known joints. When the deflection of the joint members is at a maximum the force acting on the outer ends of the arms is therefore only half that of the force which is active in a joint of the known type having only a single row of arms.

If the joint is to be used for large angles of deflection it may be necessary to provide the inner as well as the outer arms with bevelled or cut off faces, as shown particularly in Figs. 3–5. The face 20 which separates the outer spheres of the two rows may come in contact with the race at the outer end of the outer arm on the other joint member if the angle of deflection is great. In order to avoid this the outer arms may be cut off on the inside and at the corner as shown at 21. Also the surface 22 which separates the inner spheres of the two rows of arms may come in contact with the inner arms on the other joint member, if the angle of deflection is large, and the inner arms may therefore be cut off as shown at 23.

In the embodiment shown, in order to make it possible to assemble the joint members to concentric positions, they are provided with recesses 24 and 25. The profile 26 shows the outer arm of one joint member passing over the inner arm of the other joint member. When the joint members are concentrically placed they are rotated relatively to each other until the races are on the same radii.

The joint is assembled in the following manner. The joint member 2 is inserted in the housing 14 with the shaft end foremost and the outer arms entering the grooves 15 of the housing. The bisecting member 6 with the roll holder 12 is introduced into the joint member 2 and the housing is turned to a position which permits introduction of the joint member 1. The joint members are adjusted to concentric positions and the housing is rotated, in the plane of the paper in Fig. 1, until one of the rollers can be inserted in position between the races. The other rollers are introduced in a similar way, one by one, and the housing is then secured to the lid 17.

As shown the joint members have a common inner spherical surface and the roll holder a spherical outer surface in engagement with the inner spherical surface of the joint members. The roll holder is thus guided also by the inner spherical surface of the joint.

The housing serves to take up any pull on the joint members in an axial direction and the roll holder to take up any pressure in the same direction.

What I claim is:

1. Universal joint having a single centre of deflection and comprising a driving joint member having at least two pairs of arms alternately on a larger and a smaller radius from the centre of deflection, a driven joint member having the same number of arms similarly arranged, the inner arms on one joint member being situated inside of the outer arms on the other joint member and vice versa, races on the arms on both sides thereof in a peripheral direction, rollers interposed between the races for transmitting motion between the joint members, and a guide member disposed between the joint members, connected thereto and operative to guide the rollers substantially in the bisector plane of the joint members.

2. Universal joint as claimed in claim 1 in which the joint members have outer spherical surfaces of the same radius and a housing surrounding the joint and having an inner spherical surface engaging with the outer spherical surface of the joint members and having grooves for introduction of the joint members into the same.

3. Universal joint as claimed in claim 1 in which the joint members have outer spherical surfaces of the same radius and a housing surrounding the joint having an inner spherical surface engaging with the outer spherical surface of the joint members and having grooves for introduction of the joint members into the same, the grooves being on the same side of the radial central plane of the housing and extending from the outer end of the housing only to the said plane.

4. Universal joint as claimed in claim 1 in which the joint members have outer spherical surfaces of the same radius and a housing surrounding the joint having an inner spherical surface engaging with the outer spherical surface of the joint members, and a lid secured to the housing and to one of the joint members.

5. Universal joint as claimed in claim 1 in which the guide member is in the form of a roll holder having an outer spherical surface, a bisecting member operative to guide the roll holder in the bisecting plane of the joint members, and the joint members having inner spherical surfaces of the same radius engaging with the outer spherical surface of the roll holder.

6. Universal joint as claimed in claim 1 in which the joint members have inner spherical surfaces of the same radius, the guide member being in the form of a roll holder having an outer spherical surface engaging with the inner spherical surface of the joint members, and a bisecting member, connected to the joint members by means of ball and socket joints, slidable relatively to the roll holder in a radial direction and operative to guide the roll holder in the bisector plane of the joint members.

7. Universal joint as claimed in claim 1 in which the joint members have inner spherical surfaces of the same radius, the guide member being in the form of a roll holder comprising two annular members having outer spherical surfaces engaging with the inner spherical surface of the joint members, and a bisecting member, connected to the joint members by means of ball and socket joints and operative to guide the roll holder in the bisector plane of the joint members, the annular members having inner surfaces in sliding engagement with corresponding surfaces on the bisecting member permitting movement of the annular members relatively to the bisecting member in a radial direction.

8. Universal joint having a single centre of deflection and comprising a driving joint member having at least two pairs of arms alternately situated on a larger and a smaller radius from the centre of deflection of the joint, a driven joint member having the same number of arms similarly arranged, the inner arms on one joint member being situated inside of the outer arms on the other joint member and vice versa, spherical surfaces on the joint members on the outsides thereof having the same radius, spherical surfaces on the joint members on the insides thereof having the same radius, races on the arms on both sides thereof in a peripheral direction, a housing surrounding the joint members having a spherical inner surface engaging with the spherical outer surfaces of the joint members, conical rollers interposed between the races having spherical surfaces at their outer ends engaging with the inner spherical surface of the housing, a bisecting member disposed between the joint members and connected thereto by means of ball and socket joints, and a roll holder having an outer spherical surface engaging with the inner spherical surfaces of the joint members and engaging with the rollers only at the inner ends of the rollers on the outside thereof, the bisecting member being operative to guide the roll holder and the rollers in the bisector plane of the joint members.

SVEN GUSTAF WINGQUIST.

REFERENCES CITED

The following references are of record in the file of this patent:

UNITED STATES PATENTS

| Number | Name | Date |
| --- | --- | --- |
| 2,293,717 | Dodge | Aug. 25, 1942 |

FOREIGN PATENTS

| Number | Country | Date |
| --- | --- | --- |
| 563,328 | Germany | 1932 |